United States Patent Office 2,938,918
Patented May 31, 1960

2,938,918
PRODUCTION OF ω-SUBSTITUTED MONO-CARBOXYLIC ACIDS

Joe B. Lavigne, Berkeley, Calif., assignor to California Research Corporation, San Francisco, Calif., a corporation of Delaware No Drawing. Filed Feb. 12, 1958, Ser. No. 714,682

10 Claims. (Cl. 260—408)

The present invention relates to a process for producing ω-substituted aliphatic carboxylic acids.

The present application is a continuation-in-part of abandoned application Serial No. 498,099, filed March 30, 1955, in the name of Joe B. Lavigne.

U.S. Patent No. 2,601,223, to Roedel, describes a process for producing dibasic carboxylic acids by treating a peroxide of a compound having a cyclic structure consisting of from 4 to 10 carbon atoms in the primary ring, the peroxide being obtainable by reacting together hydrogen peroxide and a cylic ketone of the formula:

where R is a substituted or unsubstituted divalent radical containing from 3 to 9 carbon atoms in the ring containing the carbon atom of the carbonyl group, with a redox reducing agent. The patent describes a number of cyclic ketones which may be reacted with hydrogen peroxide to form peroxides which yield dibasic carboxylic acids when treated with redox reducing agents. As pointed out by Roedel, the cyclic ketone used may be, for example, one of the following:

Cyclobutanone, where $R=(CH_2)_3$
Cyclopentanone, where $R=(CH_2)_4$
Cyclohexanone, where $R=(CH_2)_5$
Cycloheptanone, where $R=(CH_2)_6$
Cyclooctanone, where $R=(CH_2)_7$
Cyclononanone, where $R=(CH_2)_8$
Cyclodecanone, where $R=(CH_2)_9$ Alternatively, R may contain various substituents, or may contain one or more nonaromatic double bonds. A number of redox reducing agents suitable for use in the reaction are described, and the nature of the reaction system is illustrated by a number of examples in which peroxides are reacted with redox reducing agents to produce dibasic carboxylic acids.

It has now been found that, if the process described in Patent No. 2,601,223 is carried out in the presence of a substantial quantity of an oxidizing agent and a halogen ion selected from the group consisting of chlorine and bromine ions, then the entire course of the reaction is altered, and the primary product is not a dibasic carboxylic acid but an ω-halosubstituted aliphatic monocarboxylic acid having the same number of carbon atoms as are contained in the ketone precursor of the peroxide component of the reaction mixture.

All oxidizing agents are contemplated as operative in the process; however, in order that the reducing agent will not be consumed by the oxidizing agent, it is desirable that the oxidizing agent be sufficiently weak that the reducing agent will react with the hydrocarbon peroxide more rapidly than it will react with the oxidizing agent. It has been found most desirable to employ an oxidizing agent comprising a salt of a variable valent metal. It is advantageous to use oxidizing and reducing agents having cations of the same metal since additional reducing agent can then be generated from the oxidizing agent.

Suitable reducing agents are the heavy, variable valent metals, as well as 1-ascorbic acid, sodium bisulfite, the reducing sugars, and the other reducing agents common to the redox art. The reducing agent which enters the reaction can be added directly to the reaction mixture or may be formed in situ by the reaction of one of the above reducing agents with the oxidizing agent.

The oxidizing agent may be present in an amount from about 0.1 to 20 mols, and preferably from about 0.5 to 5 mols, per mol of peroxide in the reaction mixture. The concentration of the reducing agent should be less, and desirably substantially less, than the concentration of the oxidizing agent; that is, the mol ratio of the oxidizing agent to the reducing agent should be at least one and preferably between 2 and 20.

The halogen ion may be introduced into the reaction mixture in the form of the free acid, such as hydrochloric acid and the like, or as the anion of the oxidizing agent. When different anions are present in the reaction mixture, the anion which is to form the desired ω-substituent should be present in the greatest concentration. In addition, groups other than the halogens, i.e., cyanide, thiocyanate, benzoate, formate, acetate, and the like, may be introduced into the ω-position by the use of acids or oxidizing agents having the corresponding anion.

The reaction should be carried out at temperatures in the range of about −80° C. to +150° C., and preferably from about −15° C. to +15° C. Pressures which are higher or lower than atmospheric may be employed.

The process and advantages of the present invention will be illustrated further by reference to the following examples.

Example 1

Hydrogen peroxide (56.7 grams, 0.5 mol) is added to cyclohexanone (198 grams, 2.0 mols) during a period of 7 minutes. The temperature rises from atmospheric to 41° C. Methanol (25 cc.) is added to the reaction product, which is then added to a solution of ferric chloride hexahydrate (270 grams, 1.0 mol) and ferrous chloride tetrahydrate (10.0 grams, 0.05 mol) in oxygen-free methanol (250 milliliters) over a period of 5 minutes. During the addition, the temperature is maintained at −15° C. Concentrated hydrochloric acid (87.5 milliliters, 1.05 mols) and 750 milliliters of water are added to the reaction product mixture. The solution is extracted with benzene and the benzene solutions are water-washed and then combined, dried, and distilled. Distillation is initiated at atmospheric pressure and completed at 3 to 4 millimeters pressure and a pot temperature of 110° C. The distillation residue contains 57.4 grams of ω-chlorocaproic acid. 149 grams of unreacted cyclohexanone are recovered in the distillate. Hydrogen peroxide conversion is 100%. The yield of ω-chlorocaproic acid is 81.6% based on hydrogen peroxide and 84.5% based on cyclohexanone converted.

Example 2

Hydrogen peroxide (30%, 113 grams, 1.0 mol) was added to cyclohexanone (392 grams, 4.0 mols) over 12 minutes. The temperature rose to 41° C. Methanol (25 milliliters) was added and the solution dropped over 13 minutes into methanol (400 milliliters) containing ferric chloride hexahydrate (540 grams, 2.0 mols) and ferrous chloride tetrahydrate (20.0 grams, 0.10 mol). The temperature was maintained near −5° C. Water (1000 milliliters) and concentrated hydrochloric acid (175 milliliters, 2.1 mols) were added. The solution was extracted with benzene (3×400 milliliters), and the extracts were washed, combined, dried and distilled to a pot temperature of 110° C. at 2 millimeters pressure. The distillate contained 274 grams of cyclohexanone for a 30% conversion. The pot residue contained 125 grams of ω-chlorocaproic acid and 7.6 grams of methyl ω-chlorocaproate, for a total yield of 88% of theory based on hydrogen peroxide.

Example 3

This example is a duplicate of Example 2 except that the reaction mixture was allowed to stand at room temperature for 60 hours before the product was isolated. The product, methyl ω-chlorocaproate, was obtained by distillation in 70 mol percent yield and had a boiling point of 51°–52° C. at 0.4 millimeter of mercury. The product was analyzed as follows, calculated for $C_7H_{13}O_2Cl$:

|    | Theoretical | Actual |
|----|-------------|--------|
| C  | 51.07       | 51.35  |
| H  | 7.99        | 8.02   |
| Cl | 21.53       | 21.52  |

Example 4

Hydrogen peroxide (30%, 56.7 grams, 0.5 mol) was added to cyclopentanone (420.6 grams, 5.0 mols) at room temperature. The solution was heated to 42° C. and then allowed to cool. It was then added during 5 minutes to a methanol (150 milliliters) solution of ferric chloride hexahydrate (270.3 grams, 1.0 mol) and ferrous chloride tetrahydrate (9.9 grams, 0.05 mol). The temperature was maintained at −10° C. during the reaction, and nitrogen was bubbled through continuously. Water (3 liters) and concentrated hydrochloric acid (46 milliliters) were added. The solution was extracted with four portions of benzene, and the extracts were washed, combined, dried, and distilled to give ω-chlorovaleric acid. The chloroacid boils at 118°–120° C. at 5 millimeters.

Example 5

Cyclohexanone hydroperoxide in cyclohexanone was prepared as usual from the ketone (196 grams, 2.0 mols) and 30% hydrogen peroxide (56.5 grams, 0.5 mol). It was then added at −15° C. to +5° C. to a methanol solution prepared from ferric bromide hydrate (323 grams) and ferrous sulfate heptahydrate (13.9 grams). The reaction was treated with water (500 milliliters) and concentrated hydrochloric acid (175 milliliters). Extraction with benzene (3×200 milliliters) was followed by the usual work up to give an 86% yield of ω-bromocaproic acid and a 9% yield of methyl ω-bromocaproate. The bromoacid boils at 125°–130° C. at 5 millimeters pressure.

Example 6

Cyclohexanone hydroperoxide was prepared by adding hydrogen peroxide (113 grams, 1.0 mol) to cyclohexanone (392 grams, 4.0 mols). The temperature rose to 41° C. Methanol (25 milliliters) was added and the solution added during 14 minutes to methanol (400 milliliters) containing cupric chloride dihydrate (341 grams, 2.0 mols) and cuprous chloride (9.9 grams, 0.1 mol). The temperature was maintained between −3° and −11° C. A nitrogen atmosphere was maintained. Water (1 liter) and concentrated HCl (175 milliliters) were added and the solution extracted with benzene (3×400 milliliters) and the extracts treated as usual. A 40% yield of ω-chlorocaproic acid and a 15% yield of methyl ω-chlorocaproate based on hydrogen peroxide were obtained.

Example 7

The above experiment was repeated using 2 mols chromic chloride hydrate and 0.1 mol of chromous chloride in methanol. The reaction solution was worked up as usual with dilute acid and benzene extraction to give ω-chlorocaproic acid and methyl-ω-chlorocaproate.

The foregoing examples have referred specifically to the use of iron, copper and chromium salts as oxidizing and reducing agents to produce the desired halosubstituted aliphatic acids. The corresponding salts of other metals which exhibit at least two valence levels, for example, tin, nickel, cobalt and manganese, may also be employed to produce the desired substituted aliphatic acids, and the specific metal salts used as oxidizing and reducing agents need not be salts of the same metal. For instance, a suitable combination of oxidizing and reducing agents may be a cupric salt used as the oxidizing agent and a ferrous salt used as the reducing agent.

As indicated by Example 3, protracted reaction periods in the presence of an alcohol solvent may result in the production of the corresponding alkyl ester of the ω-halo acid. The formation of the ester during the reaction, rather than the free acid, permits its ready isolation from the reaction mixture without interference because of the formation of metal salts of the carboxylic acid. The ester is a valuable chemical intermediate, for example, in the preparation of certain linear polymers, and it may be substituted for fatty esters in essentially all the uses of these latter materials.

The ω-haloaliphatic acids produced pursuant to this invention are highly useful materials. They may be substituted for fatty acids in essentially all the uses of these latter materials. The ω-chlorocaproic acids, for example, can be converted to ω-cyano acids by heating strongly with potassium or sodium cyanide. The resulting ω-cyano acids are then readily reduced to produce the ω-amino acids. The ω-halo acids can also be dehydrohalogenated, yielding unsaturated aliphatic monocarboxylic acids, which may be converted to esters having good drying properties.

While this invention has been directed to the production of ω-substituted carboxylic acids from hydroperoxides derived, for instance, from cyclic ketones of the formula:

a similar treatment of the tertiary hydroperoxides derived, for instance, from alkyl alicyclic alcohols of the general formula:

will give ω-substituted ketones. Similarly, alkylether derivatives of the cyclic peroxides may be used in the invention instead of cyclic peroxides to produce ω-substituted acid esters instead of ω-substituted acids.

Obviously, many modifications and variations of the invention as hereinbefore set forth may be made without departing from the spirit and scope thereof, and therefore only such limitations should be imposed as are indicated in the appended claims.

I claim:

1. A process for producing ω-haloaliphatic monocarboxylic acids which comprises treating a peroxide compound having a cyclic structure consisting of from 4 to 10 carbon atoms in the primary ring, said peroxide being obtainable by reacting together hydrogen peroxide and a cyclic compound of the formula:

where R is an alkylene group containing from 3 to 9 carbon atoms in the alkylene chain, with 0.1 to 20 molar equivalents of an oxidizing agent comprising a variable valent metal in the presence of a redox reducing agent and a halogen ion selected from the group consisting of chlorine and bromine ions, and separating an ω-haloaliphatic acid from the reaction mixture.

2. A process for producing ω-haloaliphatic monocarboxylic acids which comprises treating a peroxide compound having a cyclic structure consisting of from 4 to 10 carbon atoms in the primary ring, said peroxide being obtainable by reacting together hydrogen peroxide and a cyclic compound of the formula:

where R is an alkylene group containing from 3 to 9 carbon atoms in the alkylene chain, with about 0.1 to 20 mols of an oxidizing agent comprising a variable valent metal per mol of peroxide in the presence of about 0.1 to 20 mols of a halogen ion selected from the group consisting of chlorine and bromine ions, per mol of peroxide and a substantially smaller concentration of a redox reducing agent, the mol ratio of said oxidizing agent to said reducing agent being between 2 and 20, and separating an ω-haloaliphatic monocarboxylic acid from the reaction mixture.

3. A process for producing ω-haloaliphatic monocarboxylic acids which comprises treating a peroxide compound having a cyclic structure consisting of from 4 to 10 carbon atoms in the primary ring, said peroxide being obtainable by reacting together hydrogen peroxide and a cyclic compound of the formula:

where R is an alkylene group containing from 3 to 9 carbon atoms in the alkylene chain, with about 1 to 20 mols per mol of peroxide of an oxidizing agent comprising a metal halide selected from the group consisting of bromides and chlorides, and a substantially smaller amount of a reducing agent comprising a salt of the same metal at a lower valence, the mol ratio of said oxidizing agent to said reducing agent being between 2 and 20, and separating an ω-haloaliphatic monocarboxylic acid from the reaction mixture.

4. The process of claim 3 in which the metals of said oxidizing agent and reducing agent are the same.

5. The process of claim 3 in which said oxidizing agent is a ferric halide and said reducing agent is a ferrous salt.

6. The process of claim 3 in which said oxidizing agent is a cupric halide and said reducing agent is a cuprous salt.

7. The process of claim 3 in which said oxidizing agent is a chromic halide and said reducing agent is a chromous salt.

8. The process of claim 3 in which said oxidizing agent is ferric bromide.

9. A process for producing ω-chloroaliphatic monocarboxylic acids which comprises treating a peroxide compound having a cyclic structure consisting of from 4 to 10 carbon atoms in the primary ring, said peroxide being obtainable by reacting together hydrogen peroxide and a cyclic compound of the formula:

where R is an alkylene group containing from 3 to 9 carbon atoms in the alkylene chain, with a ferrous ion as the redox reducing agent in the presence of 0.5 to 5 mols of ferric chloride per mol of peroxide, and separating an ω-chlorocarboxylic acid from the reaction mixture.

10. The process of claim 3 characterized further in that said process is conducted in the presence of at least one mol of a lower alkanol per mol of peroxide and said ω-haloaliphatic monocarboxylic acid is separated from the reaction mixture in the form of the ester derived from said lower alkanol.

References Cited in the file of this patent
UNITED STATES PATENTS
2,828,338    Lavigne ---------------- Mar. 25, 1958